United States Patent
Maiuzzo et al.

(10) Patent No.: US 8,965,307 B2
(45) Date of Patent: Feb. 24, 2015

(54) CRYOGENIC HIGH POWER FILTERS FOR HIGH FREQUENCY SHIPBOARD APPLICATIONS

(75) Inventors: Michael Anthony Maiuzzo, Forest, VA (US); Ronald T. Sones, Lynchburg, VA (US)

(73) Assignee: Liberty University, Lynchburg, VA (US)

(*) Notice: Subject to any disclaimer, the term of this patent is extended or adjusted under 35 U.S.C. 154(b) by 624 days.

(21) Appl. No.: 13/155,979

(22) Filed: Jun. 8, 2011

(65) Prior Publication Data

US 2011/0301040 A1 Dec. 8, 2011

Related U.S. Application Data

(60) Provisional application No. 61/429,709, filed on Jan. 4, 2011, provisional application No. 61/405,307, filed on Oct. 21, 2010, provisional application No. 61/352,566, filed on Jun. 8, 2010.

(51) Int. Cl.
- *H04B 1/04* (2006.01)
- *H03C 1/62* (2006.01)
- *H04B 1/036* (2006.01)

(52) U.S. Cl.
CPC .................................. *H04B 1/036* (2013.01)
USPC ................ 455/114.2; 455/63.1; 455/67.13; 455/91; 455/103

(58) Field of Classification Search
USPC ............ 455/114.2, 63.1, 67.13, 91, 103, 106, 455/107, 128, 501, 66.1, 550.1, 556.1, 455/575.1, 90.3, 115.1; 330/256, 265, 277; 62/114, 268, 269, 440, 600; 505/210, 505/201–202; 326/53, 54; 333/134, 202, 333/99 S, 208

See application file for complete search history.

(56) References Cited

U.S. PATENT DOCUMENTS

| | | | | |
|---|---|---|---|---|
| 5,604,925 | A * | 2/1997 | O'Malley et al. | 455/254 |
| 6,104,934 | A * | 8/2000 | Patton et al. | 455/561 |
| 6,107,898 | A * | 8/2000 | Rauscher | 333/175 |
| 6,211,732 | B1 * | 4/2001 | Maiuzzo et al. | 330/126 |
| 6,212,404 | B1 * | 4/2001 | Hershtig | 455/561 |
| 6,480,706 | B1 * | 11/2002 | Mimura et al. | 455/140 |
| 6,501,353 | B2 * | 12/2002 | Abdelmonem et al. | 333/99 S |
| 6,529,092 | B2 * | 3/2003 | Fuke et al. | 333/99 S |
| 6,549,560 | B1 * | 4/2003 | Maiuzzo et al. | 375/136 |
| 6,567,648 | B1 * | 5/2003 | Ahn et al. | 455/83 |
| 6,625,427 | B1 * | 9/2003 | Kayano et al. | 455/115.1 |
| 6,754,510 | B2 * | 6/2004 | Hey-Shipton | 455/561 |
| 6,963,758 | B2 * | 11/2005 | Narahashi et al. | 455/561 |
| 7,283,843 | B2 * | 10/2007 | Tripathi | 455/561 |
| 7,719,384 | B1 * | 5/2010 | Arceo et al. | 333/132 |
| 7,889,021 | B2 * | 2/2011 | Maiuzzo | 333/12 |
| 7,983,637 | B2 * | 7/2011 | Kayano | 455/127.2 |
| 7,991,814 | B2 * | 8/2011 | Filippov et al. | 708/313 |
| 8,005,452 | B2 * | 8/2011 | Maiuzzo | 455/306 |

(Continued)

*Primary Examiner* — Pablo Tran
(74) *Attorney, Agent, or Firm* — Banner & Witcoff, Ltd.

(57) ABSTRACT

Systems and methods are disclosed relating to transmission of communications via high frequency antenna systems employing high-temperature superconductor filters and/or amplifiers. In certain embodiments, a comb linear amplifier combiner may be modified with, for example, cryogenically cooled and/or high-temperature superconductor components, such as matching units of bandpass filters. A computer control unit may be coupled to the transmission circuit to control operation of one or more of the low-power transmitters, filters, and/or amplifiers.

17 Claims, 5 Drawing Sheets

(56) References Cited

U.S. PATENT DOCUMENTS

| | | |
|---|---|---|
| 8,055,235 B1 * | 11/2011 | Gupta et al. .................. 455/296 |
| 8,064,555 B1 * | 11/2011 | Rockway et al. ............. 375/349 |
| 8,554,155 B2 * | 10/2013 | Gobien ........................... 455/73 |
| 2005/0107042 A1 * | 5/2005 | De Graauw ..................... 455/78 |
| 2005/0164888 A1 * | 7/2005 | Hey-Shipton ................. 505/210 |
| 2007/0146212 A1 * | 6/2007 | Ozden et al. .................. 343/702 |
| 2008/0242242 A1 * | 10/2008 | Mele et al. ................... 455/90.2 |

* cited by examiner

CRYOGENIC HIGH POWER FILTERS FOR HIGH FREQUENCY SHIPBOARD APPLICATIONS

RELATED APPLICATIONS

The present application is a non-provisional of U.S. Provisional Application Ser. No. 61/352,566, filed Jun. 8, 2010, and is a non-provisional of U.S. Provisional Application Ser. No. 61/405,307, filed Oct. 21, 2010, and is also a non-provisional of U.S. Provisional Application Ser. No. 61/429,709, filed Jan. 4, 2011, all of which are entitled "High Temperature Superconductor Filters For High Frequency Shipboard Applications." The contents of all three provisional applications are incorporated herein by reference in their entirety for all purposes

FIELD OF THE DISCLOSURE

The invention relates generally to high frequency (HF) antenna systems and more particularly to shipboard HF antenna systems employing cryogenic cooling and high temperature superconductor filters and amplifiers for use in communication transmission systems.

BACKGROUND

Shipboard antennas often use HF frequencies that require the entire ship to act as an antenna. For particular HF frequencies, heretofore, it has not been possible to achieve any reasonable transmit efficiencies. This requires enormous transmit power and results in other problems such as interference with collocated receivers. Interference mechanisms take various forms such as crossmodulation, broadband noise radiation, desensitization, intermodulation, and spurious emissions. A device that addresses many of these is the comb linear amplifier combiner (CLAC). CLAC's technique of putting the high-power amplifiers (HPAs) close to the antenna enables the use of lossy narrowband high Q filters that cleans up adjacent channel interference. Thus collocated radios can tune closer in frequency, making more efficient use of the spectrum. Yet even more efficiency is achievable with the present invention. The present invention enhances the capabilities of CLAC by attacking issues not previously or adequately addressed by CLAC. In ship environments with multiple transmit and receive frequency ranges and/or antennas, these systems have not met satisfactory performance for high speed communications.

High Temperature Superconducting (HTS) material is comprised of an alloy of various exotic materials. They can reach zero resistance but the exotic materials are power limited, resulting in HTS quenching and/or the generating of inter-modulation products, which can defeat the main purpose of CLAC. At high power levels air core, pure copper wire inductors do not have either of those problems. Cooling more conventional components such as copper coils can achieve improved performance, e.g., higher Q and lower insertion loss leading to steeper rolloff, consequently more channels with low insertion loss and much lower in-channel insertion losses.

SUMMARY

A method is presented which solves several major problems of HF shipboard communications and to efficiently connect multiple high-power HF transmitters to a small number of HF transmit antennas while simultaneously enabling the adequate reception of somewhat similar HF signals in the same co-site environment.

Use of HTS for the frequency agile filters may be advantageous because the lower powers will preclude exceeding power limits and generating excessive IM while the higher Q will clean up adjacent frequency interference issues enough to allow much smaller frequency separation between collocated radios.

One or more embodiments may consolidate multiple HF signals onto one or two HF transmit antennas and one receive antenna. To accomplish this, numerous technical challenges must be overcome. For example, certain challenges relate to the short electrical distances between antennas and the short electrical lengths of antennas ultimately arising from the long wavelengths involved. For instance, the measured isolation between shipboard HF antennas falls between 15 dB and 50 dB. Given HF transmitter power levels as high as 4 kW, or +66 dBm, the receivers could possibly experience levels as high as 100 W or +50 dBm, were it not for the deliberately high-insertion-losses in HF receive antennas on Navy ships. Therefore, in certain embodiments, care may be taken to avoid saturating the receive system front ends with such high power levels by deliberately high insertion losses in the receive antenna to receiver path.

Additionally, there are a number of mechanisms that may degrade performance of the receivers given these high power levels. These mechanisms include, for example, desensitization, reciprocal mixing, cross-modulation, receiver narrowband spurious responses, transmitter narrowband spurious emissions, receiver inter-modulation, and transmitter inter-modulation. Each of these mechanisms can deny numerous communications channels.

A problem associated with the short electrical lengths of many HF antennas is the impact of the highly capacitive impedance of the terminal impedance. FIG. 1, a plot of antenna impedance vs. frequency of a 15 foot horizontal dipole antenna, illustrates this effect. Note that the reactive impedance at 3 MHz is a negative (i.e., capacitive) 3,000 Ohms. This is an 18 dB mismatch with a 50 Ohm source or transmitter; meaning only about $\frac{1}{60}^{th}$ of the power reaches the antenna. However, by putting an inductor with a positive (i.e., inductive) 3,000 Ohm reactance in a matching unit, the insertion loss is theoretically eliminated. There is a catch however. To create sufficient inductance, many coil turns may be needed. Moreover, larger coil diameters are needed since air core inductors are indicated. As a result the HF resistance is large, the insertion loss is typically greater than 14 dB, and only about $\frac{1}{25}^{th}$ of the transmitter power reaches the antenna. This is typical of the HF insertion losses the Navy is presently coping with.

The use of a standard comb limiter combiner (CLIC) and comb linear amplifier combiner (CLAC) can be wasteful of power due to the multiplicity of sub-bands needed to cover the entire HF band and the need to minimize the number of transmitters in the same sub-band for interference mitigation purposes. Each sub-band requires amplifiers. Efficient system operation will require effectively turning off amplifiers not in use at any given instant or automatically switching the amplifier to a sub-band where it is needed. For example, given 4 transmitters are in use, theoretically only 4 sub-bands need amplification (unless transmission near sub-band crossover frequencies is present). Thus, computerized control of these switching features is needed.

HF ambient noise levels on Navy ships are much higher than receiver noise levels. Thus, HF receive-system antennas are typically designed with a negative gain vs. frequency characteristic that is inversely proportional to the "quasi-minimum" ambient-noise spectrum. The negative gain is such that the ambient noise is reduced to approximately the receiver noise level (thus receive sensitivity is not degraded). This designed receive antenna loss has the added advantage that the undesired power levels from collocated shipboard transmitters are greatly reduced.

In accordance with aspects of the invention, the CLAC output filters may be redesigned so that they are matching units as well as band pass filters (BPFs), and so that antenna and ship effects are part of the filter characteristics and inter-subband coupling is minimized. Additionally, in certain embodiments, high-temperature super conduction may be used for the matching units and filters, to reduce (or potentially to essentially eliminate) the high insertion loss usually associated with HF antenna systems. In certain examples, a goal may be set of bringing it to near 50%. Further, high-temperature super conduction may be used for the HPAs to reduce amplifier broadband noise levels, thereby enabling use of electrically closer transmit and receive antennas. In certain examples, a control unit may be used to switch CLAC high-power amplifiers on/off and/or to change sub-band placement of the HPA to improve (and potentially maximize) system efficiency. This will bring down the required number of active high-power amplifiers (HPAs) to about the number of transmitters times the average transmit duty cycle, a potentially huge power savings. Turning off a sub band amplifier not in use will have the added benefit of blocking noise and spurious emissions from leaving the transmit antenna at any frequency in that sub band passband containing the amplifier that has been turned off. Since shipboard receivers may be using those frequencies, any effect of turning off the CLAC sub band can only improve the electromagnetic compatibility of the situation. In addition to the improvement, the exciter carriers may be bandpass filtered as well, which may to a great extent suppress the out of band spurious and noise. The use of sub banding associated with CLIC and CLAC and frequency agile filters at the receiver inputs and the low-power transmitter outputs, with careful design, will maximize the number of radios that can be accommodated by mitigating virtually all of the interference mechanisms associated with topside design, save a few such as "rusty bolt inter-modulation."

BRIEF DESCRIPTION OF THE DRAWINGS

A more complete understanding of the disclosure and the advantages thereof may be acquired by referring to the following description in consideration of the accompanying drawings, in which like reference numbers indicate like features, and wherein.

DETAILED DESCRIPTION

Figure 1:
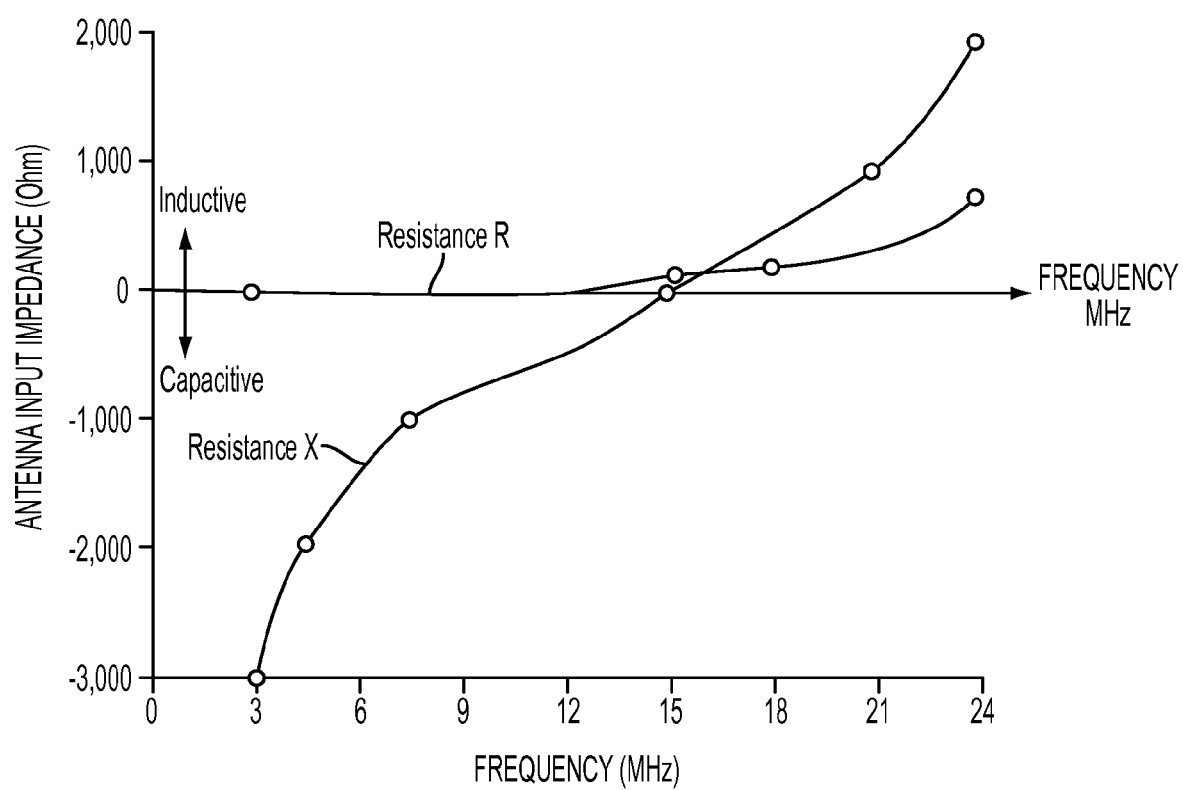
FIG. 1 is a graph illustrating the terminal impedance of an antenna in accordance with certain aspects of the invention.

High frequency (HF) antennas are notoriously not amenable to efficient operation using conventional methods. For example, FIG. 1 illustrates the terminal impedance of an antenna. This plot may represent a 10 meter "half-wave" dipole antenna. This antenna can be used at 15 MHz without a matching network. This is because its impedance at 15 MHz is close to 50 Ohms. Note that the reactive part of the impedance is approximately zero at 15 MHz and the real part is close to 50 Ohms. Thus it is a good match to typical transmitter output stages, resulting in high efficiency transmission. However, most HF antennas used at the low end of the HF band are very reactive. At 3 MHz, FIG. 1 indicates a negative (i.e. capacitive) reactance of 3,000 Ohms. For efficient operation, this requires a positive (i.e. inductive) reactance of +3000 Ohms in series with the −3,000 Ohm antenna. This may be achieved by a large and typically lossy inductor, resulting in low efficiency. Because of such things, typically less than 5% of a transmitter's power reaches the HF antenna at these frequencies.

Figure 2:
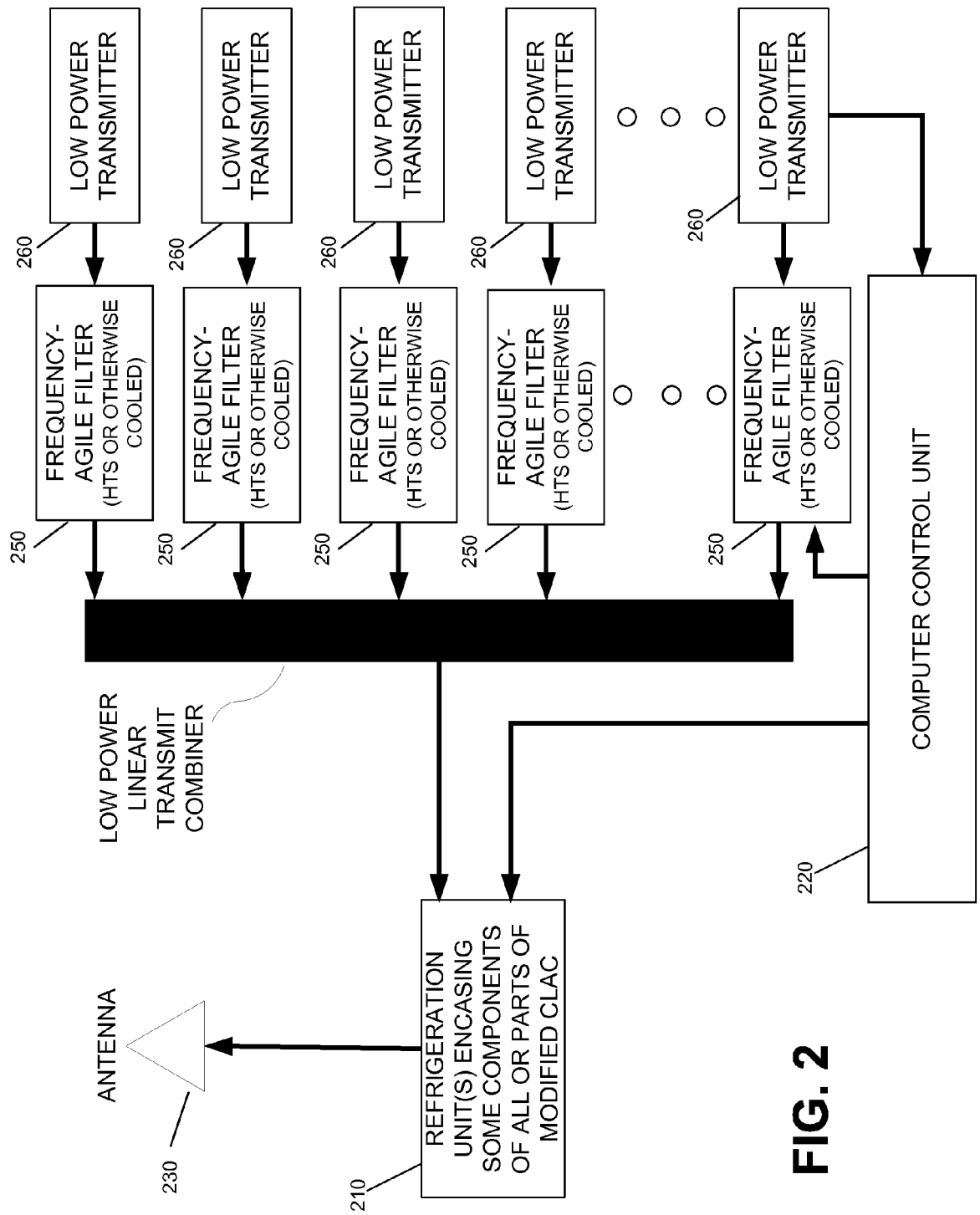
FIG. 2 is a block diagram showing a plurality of relatively low-power transmitters coupled through frequency agile filters to a modified comb-linear-amplifier combiner MCLAC encased partially or wholly by a high temperature superconductor (HTS) refrigeration unit for use with selective high frequency bands, in accordance with certain aspects of the invention.
Figure 3:
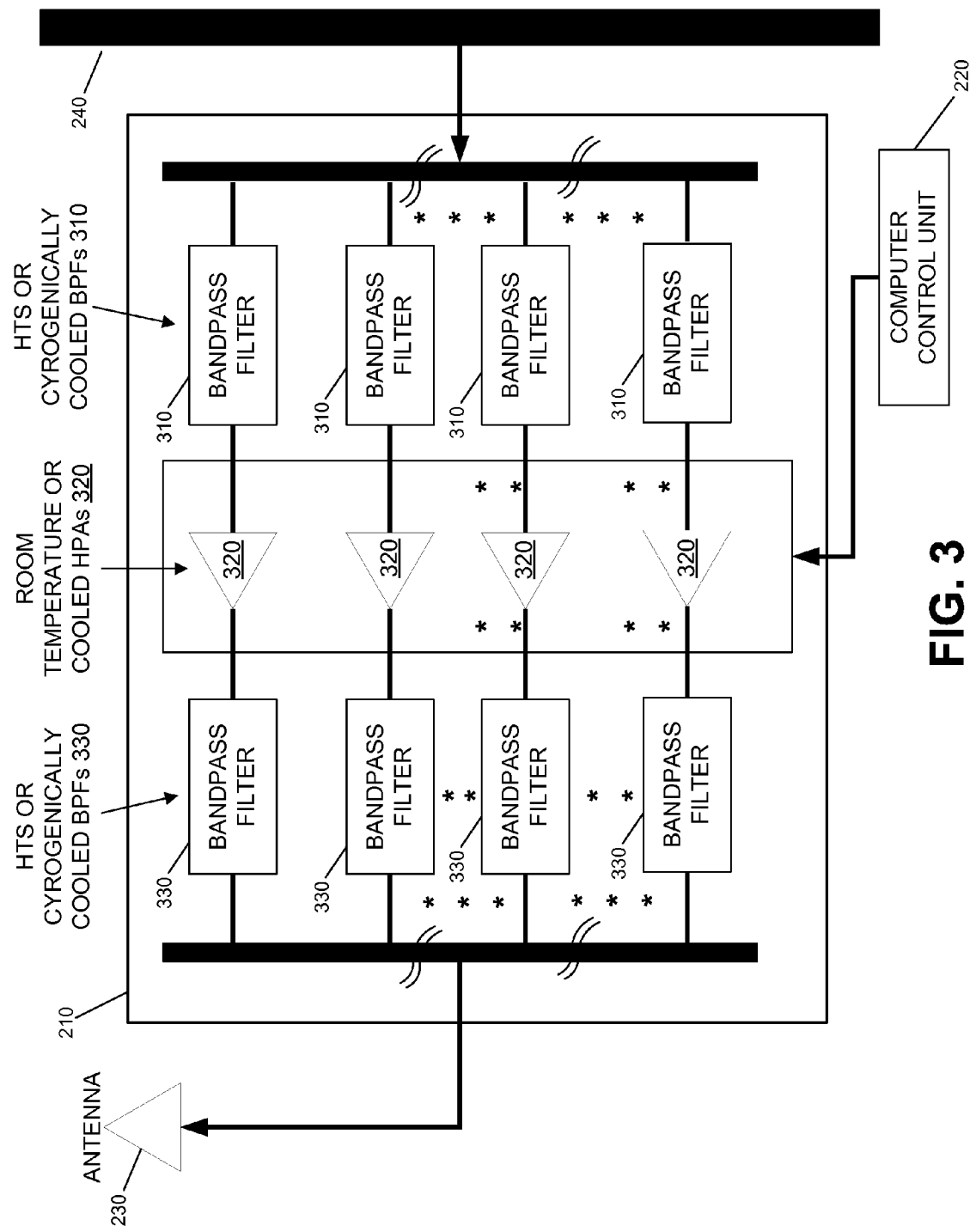
FIG. 3 is a block diagram of a modified comb linear amplifier combiner (MCLAC), in accordance with certain aspects of the invention.

In some embodiments of the present invention, the fraction of power reaching the antenna to may be increased to around 50% or even more. For example, as shown in FIGS. 2 and 3, the use of high-temperature superconducting (HTS) air-core core inductors in the output stage of each sub-band of a comb linear amplifier combiner (CLAC) may be employed to provide this efficiency.

In addition, the inductors as used herein to match, or cancel, the capacitive reactance of the antennas may be very linear to avoid generation of IM products. Hence cored inductors will not function nearly as well as air-core inductors. This HTS coil allows the device to operate at high efficiency even where the lossy nature of a convention coil will only operate at low efficiencies. Thus, to cancel the high reactive impedance of HF antennas at low frequencies, many coil turns are needed driving up the HF resistance of the wire. This can be the primary source of the insertion loss of the coil.

Research done by the inventors examined the cause of the insertion loss caused by the combination of a specific tuning unit and an HF antenna resulting in 95% insertion loss in the transmitter's available power. The study revealed that the power loss was primarily due to the inductor's HF resistance. Thus the insertion loss could be largely resolved by reducing or eliminating this resistance through the use of HTS materials in an air core inductor. Conventional means are not efficient. For example, use of ferrite cores could enable reduced wire length but the high transmit power would result in nonlinear intermodulation products in the cores. The dimensions of the inductor (and resulting resistance) are fixed by the circumstances of space, antenna reactance and transmit power.

The development of high temperature superconducting materials and a previous invention of the comb linear amplifier combiner (see, U.S. Pat. No. 6,211,732 "CLAC Patent", herein incorporated by reference, enable embodiments of the present invention to solve this problem. The term HTS refers to materials that have super-conduction properties at temperatures above that which liquid nitrogen provides sufficient cooling.

The CLAC Patent allows multiple transmitters to transmit through one antenna 230. While this works well for many applications, at certain HF frequencies, it is very inefficient requiring tremendous transmit power and results in undesirable noise. Referring to FIG. 3, the CLAC apparatus 210 passes low powered transmit signals through a bank of bandpass filters 310. The transmit signals then pass through cooled class A amplifiers 320 which amplify the transmit signals to full transmit power. Without cooling, the amplifiers 320 generate broadband noise levels as determined by the amplifier noise temperature, close to 300 degrees Kelvin. Cooling can reduce that level by about 7 dB. This means that the noise levels seen at the input of collocated receivers can be reduced by that amount. Assume that typical isolations between HF transmit and collocated receive antennas are around 25 dB. Further assume the receiver noise figure and HPA noise figures are comparable. The radiated HPA noise levels exceed room temperature by approximately the HPA (including preamps) power gain. Say, for example, 40 dB is the least required. To mitigate receiver signal masking by the CLAC amplifiers, the cooling is desirable. The full transmit powers are then transmitted through a single transmission antenna 230. Embodiments of the present invention include utilizing HTS bandpass filter matching units between the combiner and the high-power amplifiers. See FIG. 3. These filters include the antenna itself and its impedance as part of each BPF design. Because the wavelengths of frequencies in this band are near the ship's dimensions the ship itself forms part of the antenna. Because of this, the antenna/ship characteristics are included in the design of the BPF and may be part of the filter. The output BPF 330 is designed to include the antenna impedance to the extent it matches the impedance of the antenna/ship 230. In FIG. 3, the top BPF passes signals in the segment at the low end of the HF band where the antenna impedance is very capacitive. Thus the filter is labeled inductive at resonance to indicate it cancels the capacitive reactance of the antenna/ship. As stated before the cooling enables the elimination of the extremely high insertion loss of the filter which would otherwise occur.

The embodiments shown in FIGS. 2 and 3 cleans up spectral skirts and reduces RAS effects, RIM, TIM, SE and SR. Referring to FIG. 3, the HTS inductive-Resonance BPF, Resistive Resonance BPF 310, and Capacitive Resonance BPF 330 are chosen in accordance with the parameters specified in FIG. 1. In this manner, the combined low-power transmit signals split up by following the path of least resistance through the BPF(s) affording the least frequency rejection. The signals in each sub-band are amplified by the HPA 320 in the sub-band. If no signals are in a sub-band, or relatively close in frequency in an adjacent sub-band, the DC power to that HPA 320 is effectively eliminated until such signal(s) are present.

A computer control unit 220 (see FIG. 2) may be coupled to the CLAC 210, one or more (e.g. all) of the frequency agile filters 250, and one or more (e.g., all) of the low power transmitters 260. In this configuration, the computer control unit 220 may control the low power transmitters 260 both as to activation, phase, and power as well as the frequency agile filters 250. The frequency agile filters 250 may be controlled via a digital or analog signal. Part of the information coming from the low power transmitters 260 may include the frequency of the next signal coming through. The computer control unit 220 may use this information by tacking metadata onto the signal going into the frequency agile filter 250 to track the signal as it is processed by the HPA. Once the last signal at a given frequency passes, the computer control unit 220 minimizes power to that HPA until its frequency is again required. The metadata may be modulated on the signal and/or sent before or after the signal. The computer control unit 220 may be an integrated circuit such as a microprocessor, one or more signal processing units, and one or more interface circuits.

The HPAs 320 preferable are HTS so as to greatly reduce its broadband noise level, enabling closer spacing of transmit and receive antennas. Should two signals appear in the same sub-band at the same time, intermodulation products could result in denying communications channels for use. To avoid this, the output BPF filter bank is used. These filters include the antenna itself and its impedance as part of each BPF design. Because of this, the antenna/ship characteristics are typically included in the design of the BPF and be part of the filter.

The output BPF is designed to include the antenna impedance to the extent it matches the impedance of the antenna/ship. In FIG. 2, the top BPF covers the segment at the low end of the band where the antenna impedance is very capacitive. Thus the filter is labeled inductive at resonance to indicate it cancels the capacitive reactance of the antenna/ship. As stated before the cooling enables the elimination of the extremely high insertion loss of the filter which would otherwise occur.

FIGS. 2-3 shows an embodiment having a bank of power transmitters/receivers operating in a cooled environment, e.g., liquid nitrogen. In this embodiment, a set of frequency-agile filters 250 may be employed. In this embodiment, the high-power amplifier is also cooled to cryogenic temperatures. Although cryogenic cooling techniques may be used in this embodiment, it should be understood that in this and/or other embodiments that cooled conventional components may be sufficient and employed. FIG. 2-3 may also employ one or more multi-input high-power linear combiners for each antenna. The combined transmit signals may be divided using the filter network and follow the path of least resistance through the BPF(s) affording the least frequency rejection. In exemplary embodiments, the signals in each sub-band are amplified by the HPA 320 in the sub-band. If no signals are in a sub-band, or relatively close in frequency in an adjacent sub-band, the DC power to that HPA 320 may be effectively eliminated until such signal(s) are present. The filter reduces broadband noise level, enabling closer spacing of transmit and receive antennas.

The band-splitting features of CLAC 210 would be maintained, but each HTS matching unit would match the antenna impedance at the subband frequency. For example, using FIG. 1, the first matching unit (say designed for a match at 3 MHz) would have 3000 Ohms inductive reactance at the combiner at 4.5 MHz. The units would desirably be designed as a single device to avoid impedance loading between them and to avoid back propagation of signals in adjacent matching units that could result in blocked channels due to "back-intermodulation' interference.

Figure 4:
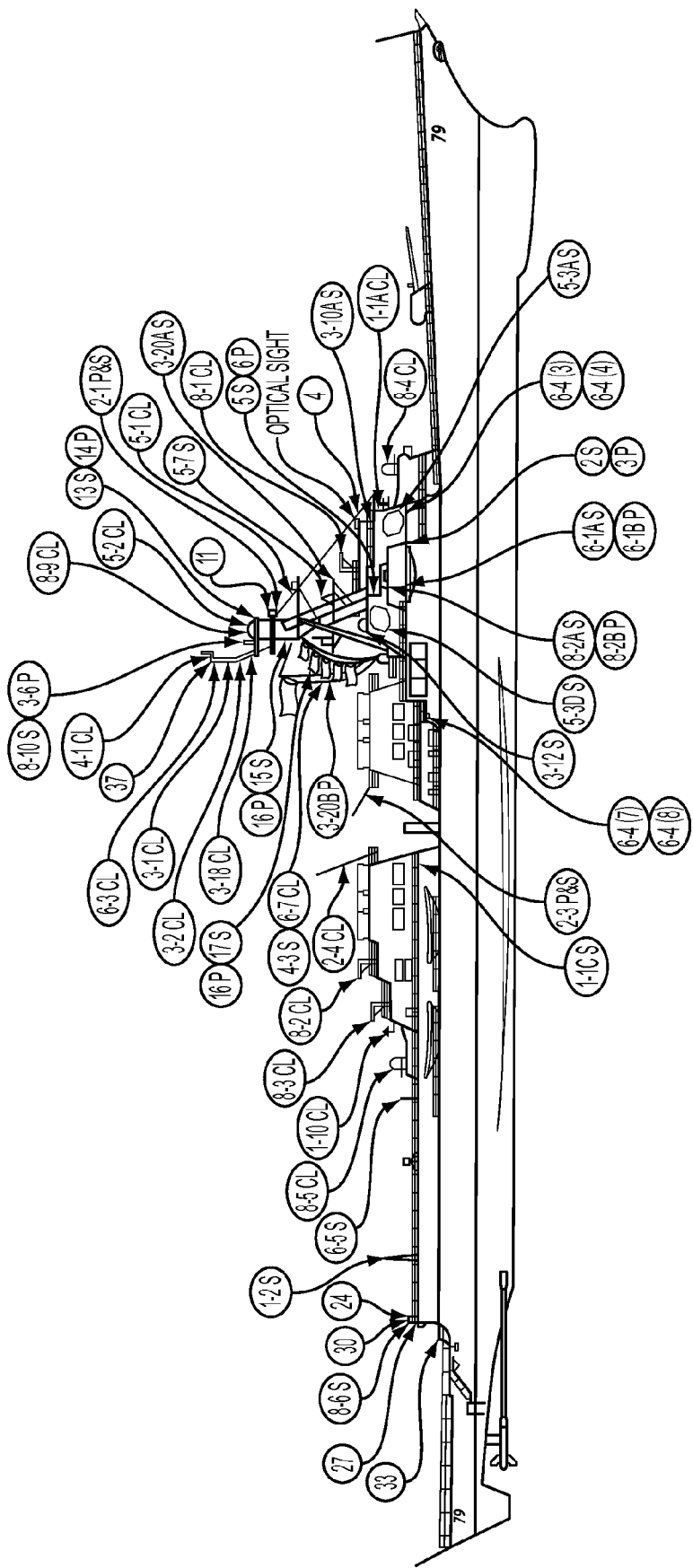
FIG. 4 is an illustrative diagram indicating the co-location of multiple shipboard antennas, in accordance with certain aspects of the invention.

As shown in FIG. 4, Navy ships often accommodate many antennas which often leads to a number of problems. Packing antennas close together results in interference to the various systems. The closeness means that the power from a collocated transmitter in a "victim receiver's channel" is likely to exceed the power of the signal the receiver is trying to detect from a far away transmitter. This is generally termed the "near-far" problem. Spreading out the shipboard antennas can help to alleviate this problem, but that requires fewer shipboard antennas. CLAC accomplishes that. Because of the near-far problem, many channels are denied to the communications systems on board.

Figure 5:
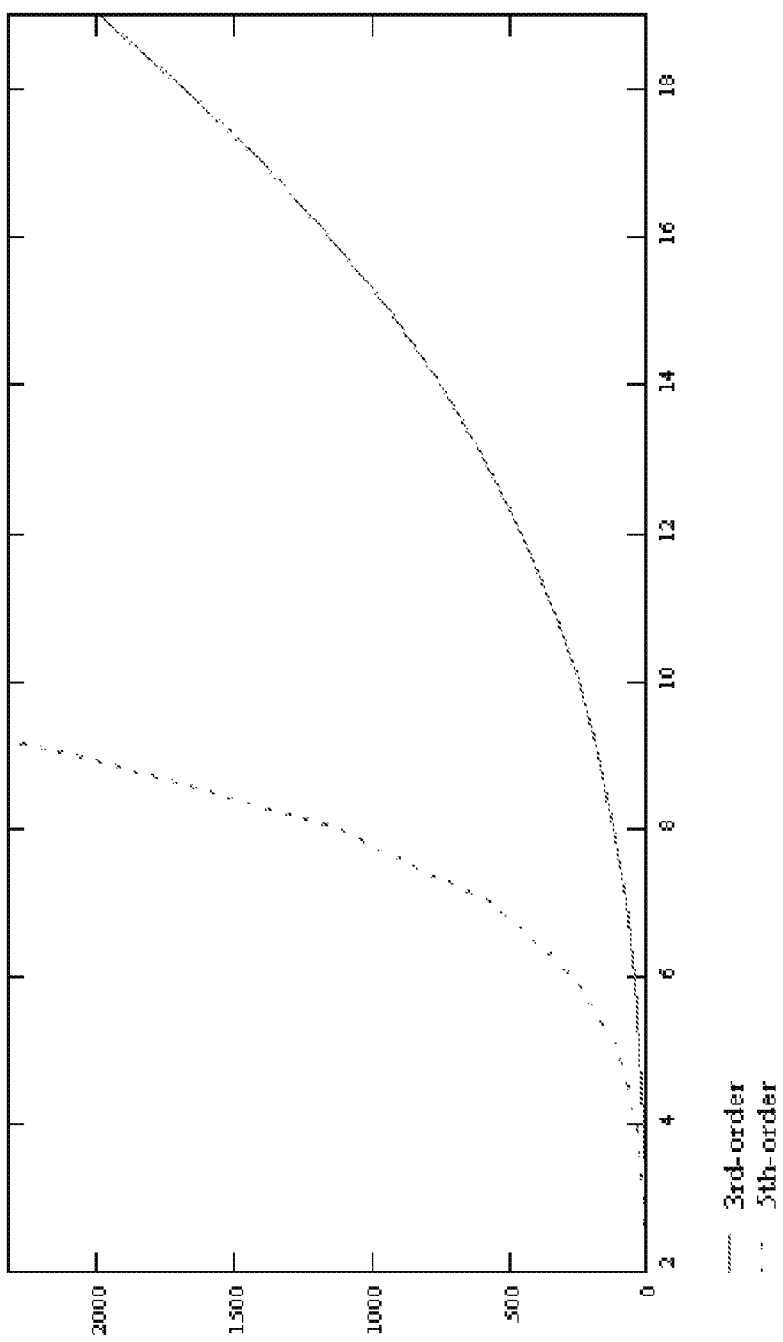
FIG. 5 is a graph illustrating an exponential growth of the number of HF channels containing an intermodulation product carrier if, for example, all signals passed through the same single broadband amplifier.

Compounding this problem, the Navy would like to deploy many additional automatic link establishment (ALE) systems. These systems check availability of channels and rapidly change frequency when advantageous. Without careful attention to determination of interference-free channels readily available with fixed tuned radios, ALE results in potential system degradation in communications range from the presence of inter-modulation products. Intermodulation products result when two or more high-power signals pass through the same non-linear device at the same time. FIG. 5 illustrates the exponential growth of the number of HF channels containing an intermodulation product carrier if, for example, all signals passed through the same broadband amplifier. The number of HF transmitters on board and radiating typically exceeds 5. From the FIG. 5 we see (adding the two curves) that the number of channels denied just from $3^{rd}$ and $5^{th}$ order intermodulation (many more higher order products could be significant) would exceed one or two hundred out of the 1,100 available. The picture is much bleaker however, as each product denies somewhere around 5 channels due to spectral spreading which is characteristic of inter-modulation-product signals. Thus embodiments of the present invention are useful in embodiments where it is desirable to prevent high-power nonlinear device coupling between transmitters. This may be accomplished by the band splitting afforded by CLAC which has been successfully demonstrated for VHF and UHF bands to essentially eliminate the degradation due to these products, and now will be afforded in the HF band with the present invention.

We claim:

1. An apparatus comprising:
   a transmit circuit configured to operate on a transmit antenna comprising:
      a cryogenically cooled amplifier bank comprising a plurality of cryogenically cooled pure copper band limited high power amplifiers, wherein each cryogenically cooled pure copper band limited high power amplifier of the cryogenically cooled amplifier bank is configured to amplify a low power transmit signal received from a combiner node, resulting in an amplified transmit signal transmitted to a cryogenically cooled band limited output stage; and
      the cryogenically cooled band limited output stage, comprising:
         an output filter bank configured to transmit the amplified transmit signal to the transmit antenna, the output filter bank comprising a plurality of cryogenically cooled pure copper output bandpass filters; and
         a cryogenically cooled air core pure copper inductor coupled to the transmit antenna, wherein the cryogenically cooled air core pure copper inductor is configured to cancel capacitive or inductive effects of the transmit antenna.

2. The apparatus of claim 1, wherein the combiner node is configured to combine a plurality of low-power transmit signals received from a plurality of low power transmitters, and wherein the combiner node is configured to transmit, to a cryogenically cooled transmit circuit, low power transmit signals received from each of a plurality of cryogenically cooled frequency agile filters.

3. The apparatus of claim 2, wherein each of the plurality of cryogenically cooled frequency agile filters is configured to receive data from a corresponding low power transmitter and provide data to the combiner node.

4. The apparatus of claim 1, the transmit circuit comprising a plurality of matching units each corresponding to a substantially unique sub-band frequency, each of the plurality of matching units comprising:
   one of the plurality of cryogenically cooled pure copper output bandpass filters, which is coupled to one of the plurality of cryogenically cooled pure copper band limited high power amplifier, which is coupled to a cryogenically cooled pure copper input bandpass filter.

5. The apparatus of claim 1, further comprising a computer control unit configured to:
   determine that transmission at a first sub-band frequency is not needed at a first time;
   identify a first high-power amplifier (HPA) coupled to a cryogenically cooled copper bandpass filter corresponding to the first sub-band frequency; and
   minimize power to the first HPA at the first time.

6. The apparatus of claim 5, wherein the computer control unit is further configured to:
   determine that transmission at the first sub-band frequency is needed at a second time after the first time; and
   restore power to the first HPA at the second time.

7. The apparatus of claim 5, wherein the computer control unit is further configured to:
   determine that transmission at a second sub-band frequency is needed at a second time after the first time; and
   switch the first HPA to the second sub-band frequency at the second time.

8. The apparatus of claim 1, further comprising a control unit configured to:
   determine a frequency of the low power transmit signal;
   identify a first cryogenically cooled pure copper band limited high power amplifier of the plurality of cryogenically cooled pure copper band limited high power amplifiers that corresponds to the frequency of the low power transmit signal;
   maintain each cryogenically cooled pure copper band limited high power amplifier that does not correspond to the frequency of the low power transmit signal in a switched off state;
   track the low power transmit signal through the first cryogenically cooled pure copper band limited high power amplifier, and
   in response to determining that the low power transmit signal has passed through the cryogenically cooled amplifier bank, switching off the first cryogenically cooled pure copper band limited high power amplifier.

9. A method for transmitting communications comprising:
   amplifying, by a cryogenically cooled amplifier bank comprising a plurality of cryogenically cooled pure copper band limited high power amplifiers, a low power transmit signal received from a combiner node, resulting in an amplified transmit signal;
   transmitting, by the cryogenically cooled amplifier bank, the transmit signal to a plurality of cryogenically cooled pure copper output bandpass filters;
   transmitting, by a cryogenically cooled pure copper output bandpass filter of the plurality of cryogenically cooled pure copper output bandpass filters, the amplified transmit signal to a transmit antenna; and
   canceling, by a cryogenically cooled air core pure copper inductor coupled to the transmit antenna, capacitive or inductive effects of the transmit antenna.

10. The method of claim 9, further comprising:
    combining a plurality of low-power transmit signals received from a plurality of low power transmitters.

11. The method of claim 10, further comprising:
    filtering the plurality of low-power transmit signals using a plurality of cryogenically cooled copper frequency agile filters.

12. The method of claim 9, further comprising:
determining that transmission at a first sub-band frequency is not needed at a first time;
identifying a first high-power amplifier (HPA) configured to provide data to a cryogenically cooled copper bandpass filter corresponding to the first sub-band frequency; and
minimizing power to the first HPA at the first time.

13. The method of claim 12, further comprising:
determining that transmission at the first sub-band frequency is needed at a second time after the first time; and
restoring power to the first HPA at the second time.

14. The method of claim 12, further comprising:
determining that transmission at a second sub-band frequency is needed at a second time after the first time; and
switching the first HPA to the second sub-band frequency at the second time.

15. The method of claim 9, further comprising:
determining, by a control unit, a frequency of the low power transmit signal;
identifying a first cryogenically cooled pure copper band limited high power amplifier of the plurality of cryogenically cooled pure copper band limited high power amplifiers that corresponds to the frequency of the low power transmit signal;
maintaining, by the control unit, each cryogenically cooled pure copper band limited high power amplifier that does not correspond to the frequency of the low power transmit signal in a switched off state;
tracking, by the control unit, the low power transmit signal through the first cryogenically cooled pure copper band limited high power amplifier, and
in response to determining that the low power transmit signal has passed through the cryogenically cooled amplifier bank, switching off, by the control unit, the first cryogenically cooled pure copper band limited high power amplifier.

16. A cryogenically cooled transmission circuit comprising:
a plurality of cryogenically cooled pure copper input bandpass filters coupled to a plurality of cryogenically cooled pure copper high power amplifiers, wherein the plurality of cryogenically cooled pure copper input bandpass filters are impedance matched to the plurality of cryogenically cooled pure copper high power amplifiers;
a plurality of cryogenically cooled pure copper output bandpass filters coupled to an antenna and the plurality of cryogenically cooled pure copper high power amplifiers, wherein the plurality of cryogenically cooled pure copper output bandpass filters are configured to transmit an amplified transmit signal received from a high power amplifier to the antenna; and
a cryogenically cooled air core pure copper inductor coupled to the antenna, wherein the cryogenically cooled air core pure copper inductor is configured to cancel capacitive or inductive effects of the antenna.

17. The cryogenically cooled transmission circuit of claim 16, further comprising a control unit configured to minimize power to one or more cryogenically cooled pure copper high power amplifiers of the plurality of cryogenically cooled pure copper high power amplifiers upon detecting that a frequency range assigned to the one or more cryogenically cooled pure copper high power amplifier is not required for transmission.

* * * * *